No. 790,802. PATENTED MAY 23, 1905.
C. F. PETERMANN.
RIPPLING MACHINE, APPLICABLE TO FLAX, HEMP, OR SUCH LIKE.
APPLICATION FILED MAY 16, 1903.

Witnesses.

Inventor:
C. F. Petermann

No. 790,802. Patented May 23, 1905.

UNITED STATES PATENT OFFICE.

CARL FERDINAND PETERMANN, OF CHEMNITZ, GERMANY.

RIPPLING-MACHINE, APPLICABLE TO FLAX, HEMP, OR SUCH LIKE.

SPECIFICATION forming part of Letters Patent No. 790,802, dated May 23, 1905.

Application filed May 16, 1903. Serial No. 157,479.

*To all whom it may concern:*

Be it known that I, CARL FERDINAND PETERMANN, a subject of the Emperor of Germany, residing at Peter street No. 1, Chemnitz, Germany, have invented certain new and useful Improvements in Rippling-Machines, Applicable to Flax, Hemp, or Such Like, of which the following is a specification.

The operation of rippling or stripping flax, formerly effected by hand, has more recently been carried out mechanically by machines provided with rollers capable of performing the operation. However, by the action of the rollers in such machines the seed-bolls become partly crushed and impart an uneven or mixed color to the flax-stalks at the subsequent steeping operation. Further, the stalks of the weeds are not removed by the rolling action.

Figure 1:
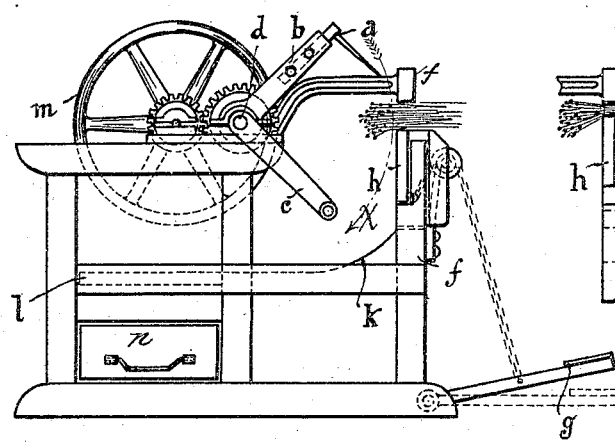
Figure 2:
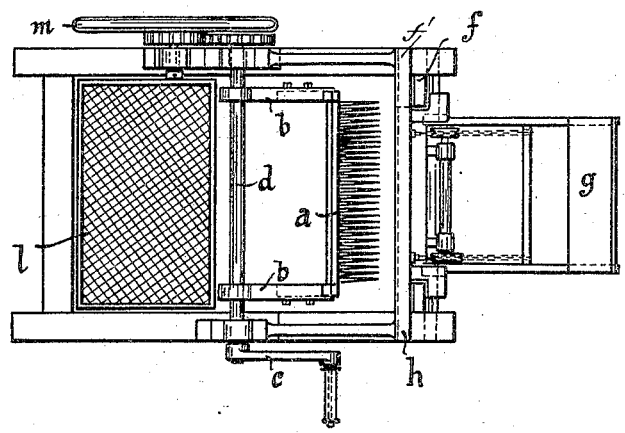
Figure 3:
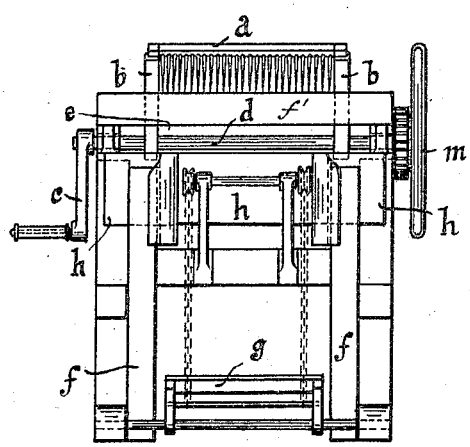

My improved machine, represented in the annexed drawings, in which Figure 1 is a side elevation, Fig. 2 a plan, and Fig. 3 a front elevation, has no working rollers to affect or damage of the flax, but treats the flax exactly after the manner of hand-stripping.

Figure 4:
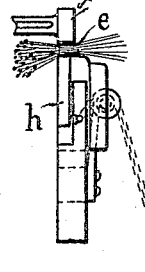

A comb $a$ is attached to two arms $b$, preferably slotted and adapted to revolve with a shaft $d$, to which they are fixed, the shaft being rotated by means of a crank or a pulley. The flax is entered through the opening $e$ beneath the fixed top rail $f'$ and limited by a movable bar $h$ on the frame $f$. After its introduction the flax is held tight by the said bar $h$, which is caused to rise, as shown in Fig. 4, by means of a treadle mechanism $g$. The revolving comb $a$ passes through the flax in the direction shown by the arrow $x$ and strips off the seed-bolls. These then fall into the apron $k$ and roll along it until they finally drop into a box $n$ through the sieve $l$, formed at the rear end of the said apron. The stalks thus cleaned are drawn onto the apron and accumulate on the sieve $l$, where they remain until pushed out at the rear by the onward move of fresh materials. The passage of the comb is facilitated by the action of a fly-wheel $m$, provided on a shaft geared with that of the comb, as indicated.

The machine can also be used for stripping other materials than flax, such as hemp, oats, &c.

In order to obtain either a flat or beating action or else an acute or tearing action for the comb $a$, the latter is suitably adjusted within the slots of the arms $b$.

For some purposes the comb $a$ may be replaced by steel-wire brushes of sufficient resistance.

Having thus fully described my invention, what I claim as new, and desire to secure by Letters Patent of the United States of America, is—

A rippling-machine for flax, hemp and the like, comprising a rigid frame carrying a cross-shaft and means for operating the same, a comb adjustably secured to said arms, a movable cross-bar and a fixed top rail at the front of the frame, means for lifting and lowering the cross-bar, and an apron whose rear end forms a sieve, substantially as herein described.

In testimony whereof I affix my signature.

CARL FERDINAND PETERMANN.

In presence of—
E. C. MEYER,
O. A. HERRMANN.